(12) United States Patent
Kooima et al.

(10) Patent No.: US 8,235,135 B1
(45) Date of Patent: Aug. 7, 2012

(54) BAR WITH ENHANCED RIGIDITY

(75) Inventors: Phil Kooima, Rock Valley, IA (US); Nicholas Vande Waerdt, Rock Valley, IA (US)

(73) Assignee: Kooima Company, Rock Valley, IA (US)

( * ) Notice: Subject to any disclaimer, the term of this patent is extended or adjusted under 35 U.S.C. 154(b) by 155 days.

(21) Appl. No.: 12/778,272

(22) Filed: May 12, 2010

(51) Int. Cl.
*A01B 23/04* (2006.01)

(52) U.S. Cl. ..................................... 172/776

(58) Field of Classification Search .............. 172/752, 172/310, 311, 196, 219, 452, 456, 724, 740, 172/776, 720, 287; 52/694, 696, 729, 730, 52/731; 248/49, 68.1, 75, 121, 200; 280/420, 280/421, 491.2, 491.3, 491.4
See application file for complete search history.

(56) References Cited

U.S. PATENT DOCUMENTS

| | | | | |
|---|---|---|---|---|
| 3,571,878 A | * | 3/1971 | Alderfer | 492/50 |
| 3,592,142 A | * | 7/1971 | Miller | 410/129 |
| 3,798,867 A | * | 3/1974 | Starling | 52/834 |
| 3,938,294 A | * | 2/1976 | Gaburri | 52/742.14 |
| 4,092,044 A | * | 5/1978 | Hoffman | 298/27 |
| 4,726,166 A | * | 2/1988 | DeRees | 52/694 |
| 5,641,026 A | * | 6/1997 | Balmer | 172/452 |
| 6,561,736 B1 | * | 5/2003 | Doleshal | 405/251 |

OTHER PUBLICATIONS

Header Drive Adapters listing, Kooima Company catalog, Summer-Fall 2008, pp. 1-2.

* cited by examiner

*Primary Examiner* — Robert Pezzuto
(74) *Attorney, Agent, or Firm* — Jeffrey A. Proehl; Woods, Fuller, Schultz & Smith, P.C.

(57) ABSTRACT

A tool supporting bar for supporting tools on an implement comprises an elongated tubular perimeter wall defining an interior and including a side wall portion. The bar includes a reinforcing wall located in the interior of the perimeter wall and mounted on the perimeter wall in a manner effective to increase bending resistance of the perimeter wall to a force applied in a direction normal to a plane of one of the side wall portion. A method of forming a tool bar comprises providing an elongated tubular perimeter wall defining an interior and including a one side wall portion; positioning a reinforcing wall in the interior of the perimeter wall; and mounting the reinforcing wall on the perimeter wall in a manner effective to increase bending resistance of the perimeter wall to a force applied in a direction normal to a plane of the side wall portion.

18 Claims, 11 Drawing Sheets

BAR WITH ENHANCED RIGIDITY

BACKGROUND

1. Field

The present disclosure relates to bars and more particularly pertains to a new bar with enhanced rigidity that minimizes the corresponding increase in the weight of the bar, and is highly suitable for use on, for example, tool supporting structures.

2. Description of the Prior Art

The increasing size of the farming implements is motivated by the desire to complete the field activities in less and less time, and as well as the increase in the horsepower of the tractors pulling the implements. This increase in size has led to greater stresses applied to the components of the implement. For example, an implement may utilize a tool supporting bar on which various farming tools are mounted. In making the implement larger, the supporting bar is made longer to support tools for more and more rows. This greater length and pulling force increases the stresses on the bar, and the resulting flex of the bar causes the bar to deflect. Consequently, some tools mounted on the bar move with respect to other tools on the bar, and the tools mounted toward the outer ends of the bar are most susceptible to movement. As the number of rows increases, the tools handling the outer rows can be the most affected by the deflection.

However, in the case of a tool mounting bar, there is a need to maintain the size and shape of the bar as it has been generally standardized so that a variety of different types of implements may be mounted on different bars by clamping or other mounting means. It is also undesirable to greatly increase the weight of the bar, so that more of the pulling power of the tractor is essentially wasted to pull the increased weight of the implement incorporating the heavier bar.

SUMMARY

In view of the foregoing, the present disclosure describes a new tool supporting bar with enhanced rigidity that minimizes the increase in the weight of the bar.

The present disclosure relates to a tool supporting bar for supporting tools on an implement. The tool supporting bar comprises an elongated tubular perimeter wall defines an interior, and includes at least one side wall portion. The bar further comprises at least one reinforcing wall located in the interior of the perimeter wall and mounted on the perimeter wall in a manner effective to increase bending resistance of the perimeter wall to a force applied in a direction normal to a plane of one of the first and second side wall portions.

The disclosure also relates to a method of forming a tool bar, which comprises providing an elongated tubular perimeter wall defining an interior, in which the perimeter wall includes at least one side wall portion; positioning at least one reinforcing wall in the interior of the perimeter wall; and mounting the at least one reinforcing wall on the perimeter wall in a manner effective to increase bending resistance of the perimeter wall to a force applied in a direction normal to a plane of one of the first and second side wall portions.

The disclosure also further relates to a bar element that comprises an elongated tubular perimeter wall defining an interior. The perimeter wall comprises a first side wall portion and the perimeter wall includes a second side wall portion location substantially opposite of the first side wall portion. The bar element further comprises at least two reinforcing walls located in the interior of the perimeter wall. A first one of the reinforcing walls is abutted against the first side wall portion and a second one of the reinforcing walls is abutted against the second wall portion. The first reinforcing wall is attached to the first side wall portion at at least three discrete and separated locations of the first side wall portion and the second reinforcing wall is attached to the second side wall portion at least three discrete and separated locations of the second side wall portion to increase bending resistance of the perimeter wall to a force applied in a direction normal to a plane of one of the first and second side wall portions.

There has thus been outlined, rather broadly, some of the more important elements of the invention in order that the detailed description thereof that follows may be better understood, and in order that the present contribution to the art may be better appreciated. There are additional elements of the invention that will be described hereinafter and which will form the subject matter of the claims appended hereto.

In this respect, before explaining at least one embodiment or implementation in greater detail, it is to be understood that the scope of the invention is not limited in its application to the details of construction and to the arrangements of the components and particulars of the method set forth in the following description or illustrated in the drawings. The invention is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present invention.

The advantages of the various embodiments of the present invention, along with the various features of novelty that characterize the invention, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 11 thereof, a new bar with enhanced rigidity embodying the principles and concepts of the disclosed subject matter will be described.

The disclosure generally relates to the design of an elongated bar 10 with enhanced resistance to bending that would cause a longitudinal axis of the unloaded bar to deviate or bend when a load is applied to a portion of the bar. It will be recognized that the design may be applied to bars with straight and non-straight geometries, such as bars having curves or formed bends. The disclosure also relates to a method of forming such a bar. Significantly, the implementations of the disclosure may provide enhanced strength in a uniform size, without enlarging an exterior size of the bar.

Figure 1:
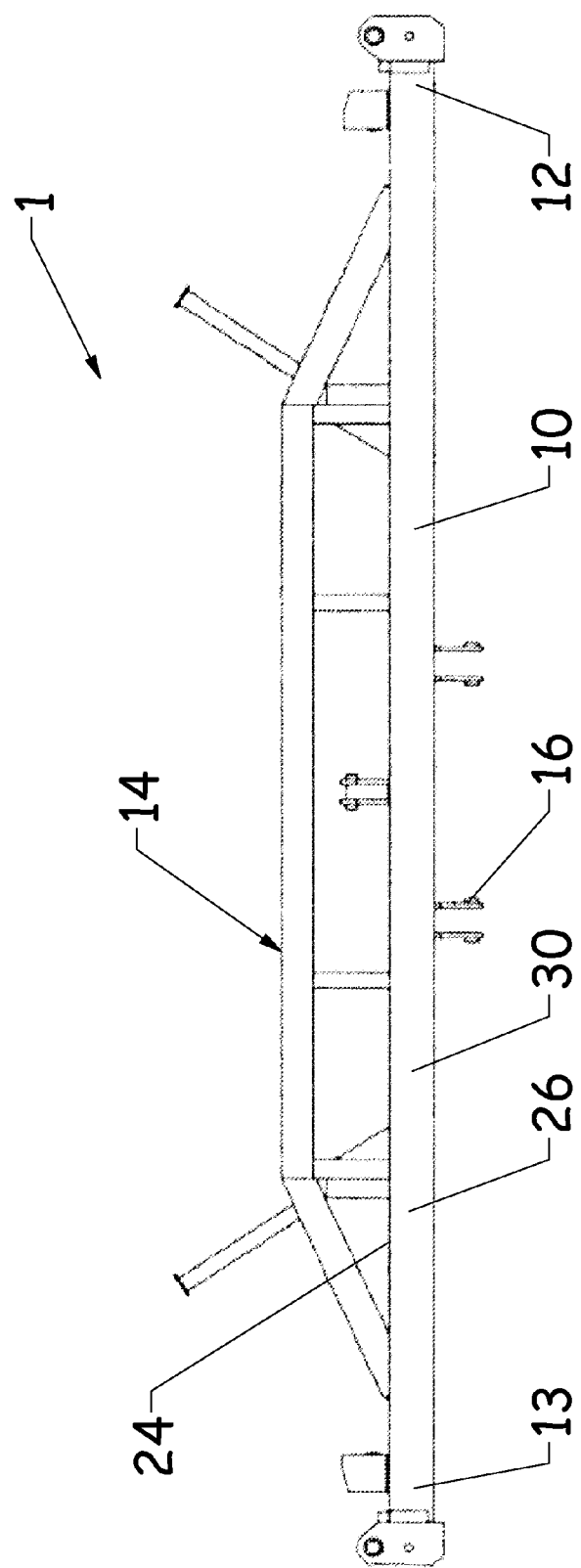
FIG. 1 is a schematic front view of a tool supporting assembly incorporating a bar with enhanced rigidity according to the present disclosure.

In one illustrative application of the disclosure, the bar 10 is incorporated into a tool supporting assembly 1 such as is shown in FIG. 1 of the drawings. The tool supporting assembly 1 including the bar 10 may be employed to support one or more tools on an implement. One benefit of the bar of the disclosure is that an increase in exterior dimensions is not required, so that the exterior dimensions are able to remain within the de facto standardized size for tool bars that is typically utilized for the bar of the tool supporting assembly 1.

In one aspect, the disclosure relates to a bar 10 having a new configuration that provides the enhanced strength, such as strength measured in terms of resistance to bending of the tool supporting bar when oppositely directed forces are applied to longitudinally-spaced locations on the bar 10. The bar 10 is elongated with opposite ends 12, 13, and has a longitudinal direction extending between the ends 12, 13. Typically, although not critically, the bar 10 has a substantially uniform exterior shape along the length of the bar between the ends, which facilitates the free movement and positioning of a tool that is configured to fit the exterior size of the bar, at substantially any location along the length of the bar. The tool supporting bar 10 may be continuous between the ends 12, 13 of the bar, without interruption, or the bar may be comprised of two or more segments between the ends so that one or more of the segments may be pivoted out of longitudinal alignment with each other for educing the length of the supporting bar 10 during periods of storage and transport. In some embodiments, the tool supporting bar 10 includes a auxiliary support structure 14 that helps to stiffen the bar 10 against bending caused by, for example, the weight of the tools mounted on the bar and the forces applied to the tools (and thus to the bar) when the tools engage the ground and are moved through the field. The auxiliary support structure 14 may comprise a secondary bar and links between the secondary bar and the tool supporting bar 10. Further, the tool supporting bar 10 may have additional mounting structures 16 for mounting the tool supporting bar on an implement frame.

In greater detail, the tool supporting bar 10 may comprise an elongated perimeter wall 20, and in some embodiments the perimeter wall forms a closed or continuous perimeter (although this characteristic is not critical to the bar). The perimeter wall 20 defines an interior 22 for the bar 10, and the interior may be substantially hollow, notwithstanding the reinforcing wall described below, although this is not a critical characteristic of the bar. The perimeter wall may have an exterior surface 18 and an interior surface 19 that faces the interior 22 of the bar. The perimeter wall 20 may comprise a tube having a substantially rectangular cross sectional shape, although other shapes may be utilized. The perimeter wall 20 may have opposite ends which generally correspond to the ends 12, 13 of the bar 10. In some embodiments, the tubing of the perimeter wall 20 has an exterior dimension of approximately 7 inches (approximately 17.75 cm) by approximately 7 inches (approximately 17.75 cm), and the thickness of the wall is approximately 0.5 inches (approximately 1.25 cm). It should be recognized that the principles of the disclosure may be applied to tubing having dimensions other than these.

The perimeter wall 20 of the bar 10 may include a first side wall portion 24 and a second side wall portion 26, and these side wall portions 24, 26 may be positioned on opposite sides of the perimeter wall 20 and may extend between the ends of the perimeter wall. The first 24 and second 26 side wall portions may be oriented in substantially parallel planes to each other. The perimeter wall 20 may also include a third side wall portion 28 and a fourth side wall portion 30, and these side wall portions may be positioned on opposite sides of the perimeter wall 20 and may extend between the ends of the perimeter wall. The third 28 and fourth 30 side wall portions may be oriented in substantially parallel planes to each other, and may be oriented in planes that are oriented substantially perpendicular to the planes of the first 24 and second 26 side wall portions. The third 28 and fourth 30 side wall portions may extend between the first 24 and second 26 side wall portions.

The perimeter wall 20 may include a plurality of apertures 32 that are formed in at least one of the side wall portions of the perimeter wall 20. The apertures 32 may extend from the exterior surface 18 of the perimeter wall to the interior surface 19 of the perimeter wall. In general, the apertures 32 may be elongated in one direction, and may be elongated in the longitudinal direction of the perimeter wall 20. The plurality of apertures 32 may be longitudinally spaced on the perimeter wall with respect to each other, and the apertures may be spaced from adjacent apertures by substantially uniform distances. In some embodiments of the bar 10, the spacing between the apertures is in the range of approximately one half of the height of the first side wall portion to approximately two time the height of the first wall portion, with the height of the first side wall portion being measured between the third and fourth side wall portions, although other spacing distances may be employed. The apertures 32 may have a width measured substantially perpendicular to the longitudinal direction of the bar 10. The width of the apertures 32 may be uniform between the exterior surface 8 and the interior surface 19. In some embodiments, the width of the apertures tapers narrower toward the interior surface 19 of the perimeter wall and wider toward the exterior surface 18. Each of the apertures 32 may have a length, and the lengths of the apertures may be uniform or may vary from one aperture to the next.

Figure 2:
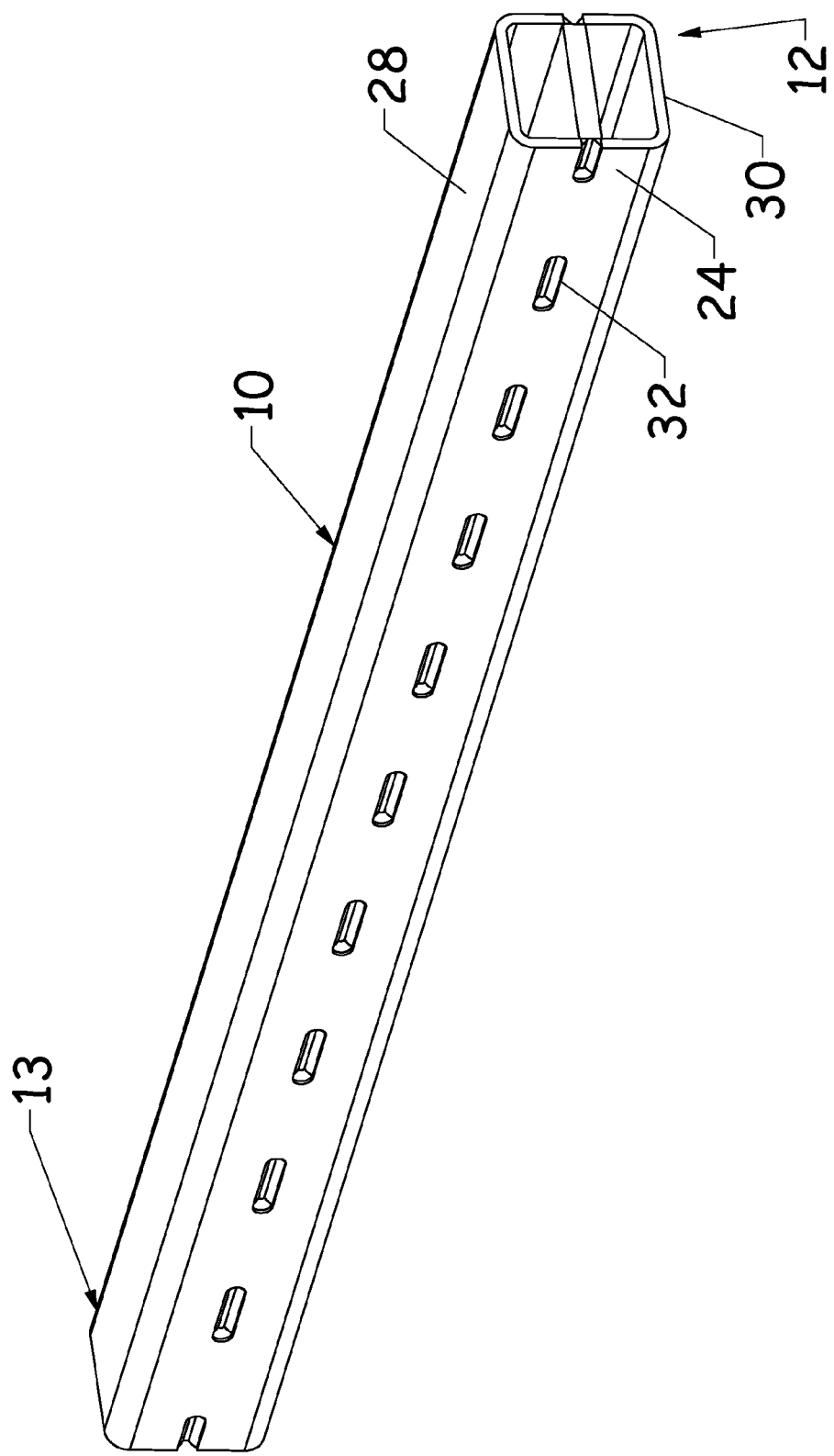
FIG. 2 is a schematic perspective view of one illustrative embodiment of the bar of the disclosure.
Figure 3:
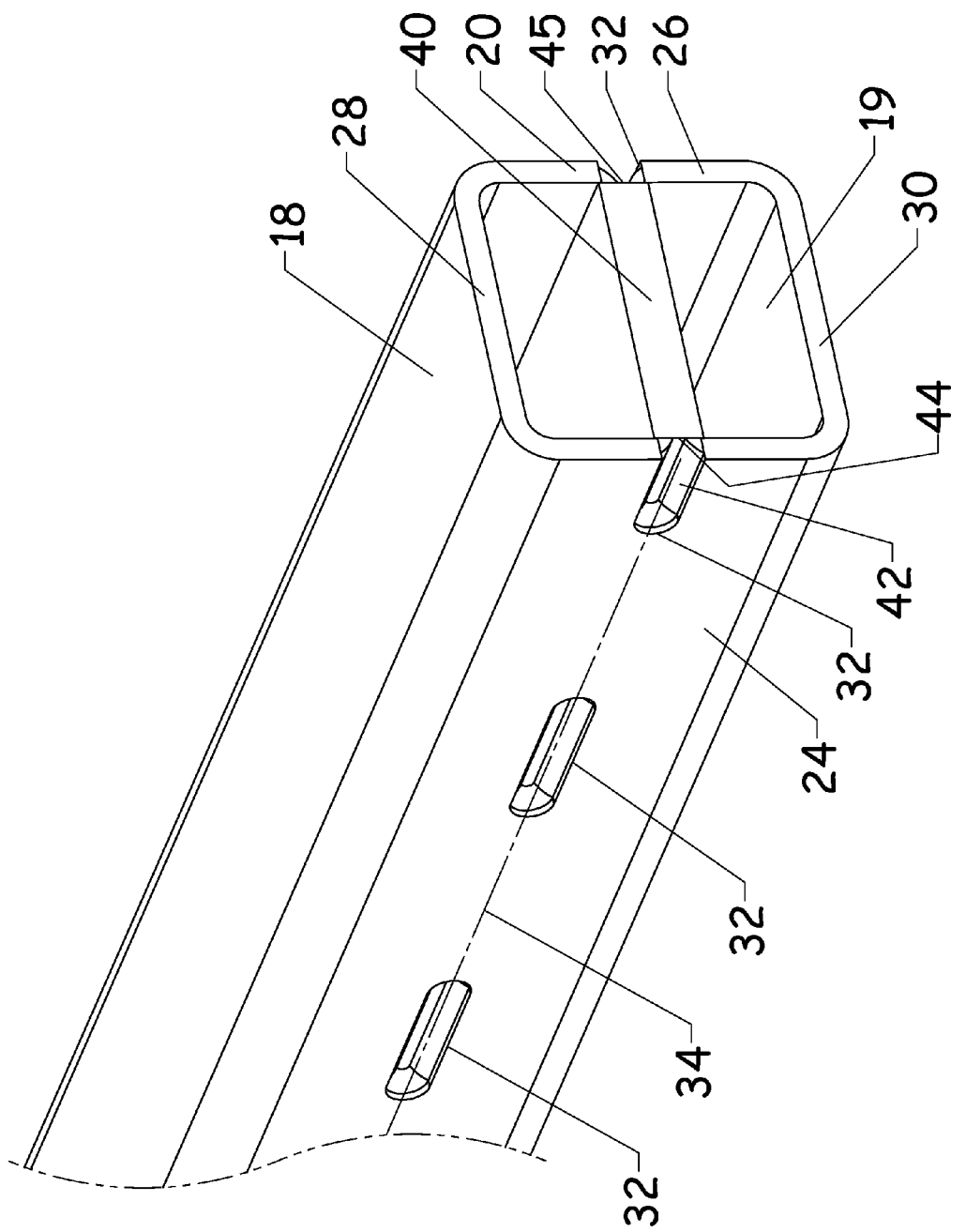
FIG. 3 is a schematic enlarged perspective view of an end portion of the illustrative embodiment of the bar shown in FIG. 2.
Figure 4:
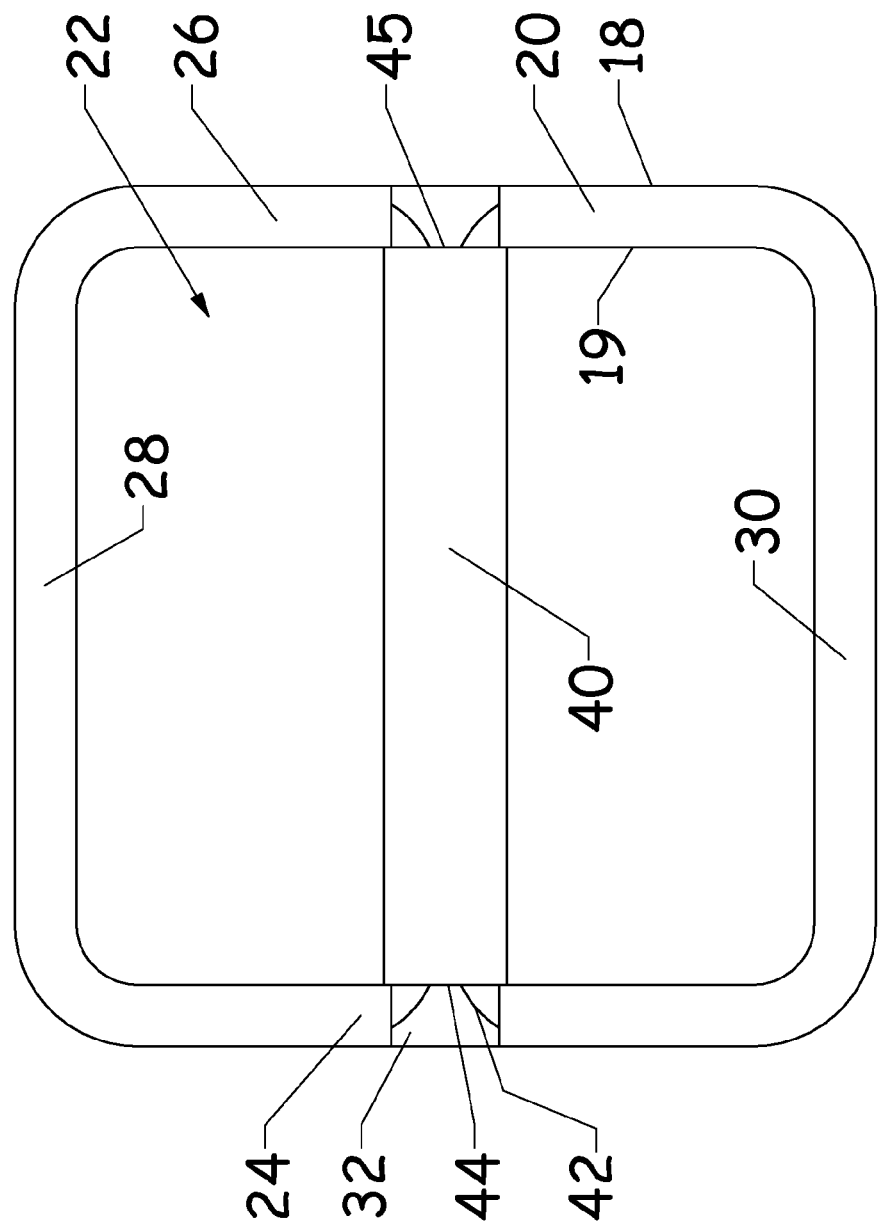
FIG. 4 is a schematic end view of the illustrative embodiment of the bar shown in FIG. 2.
Figure 5:
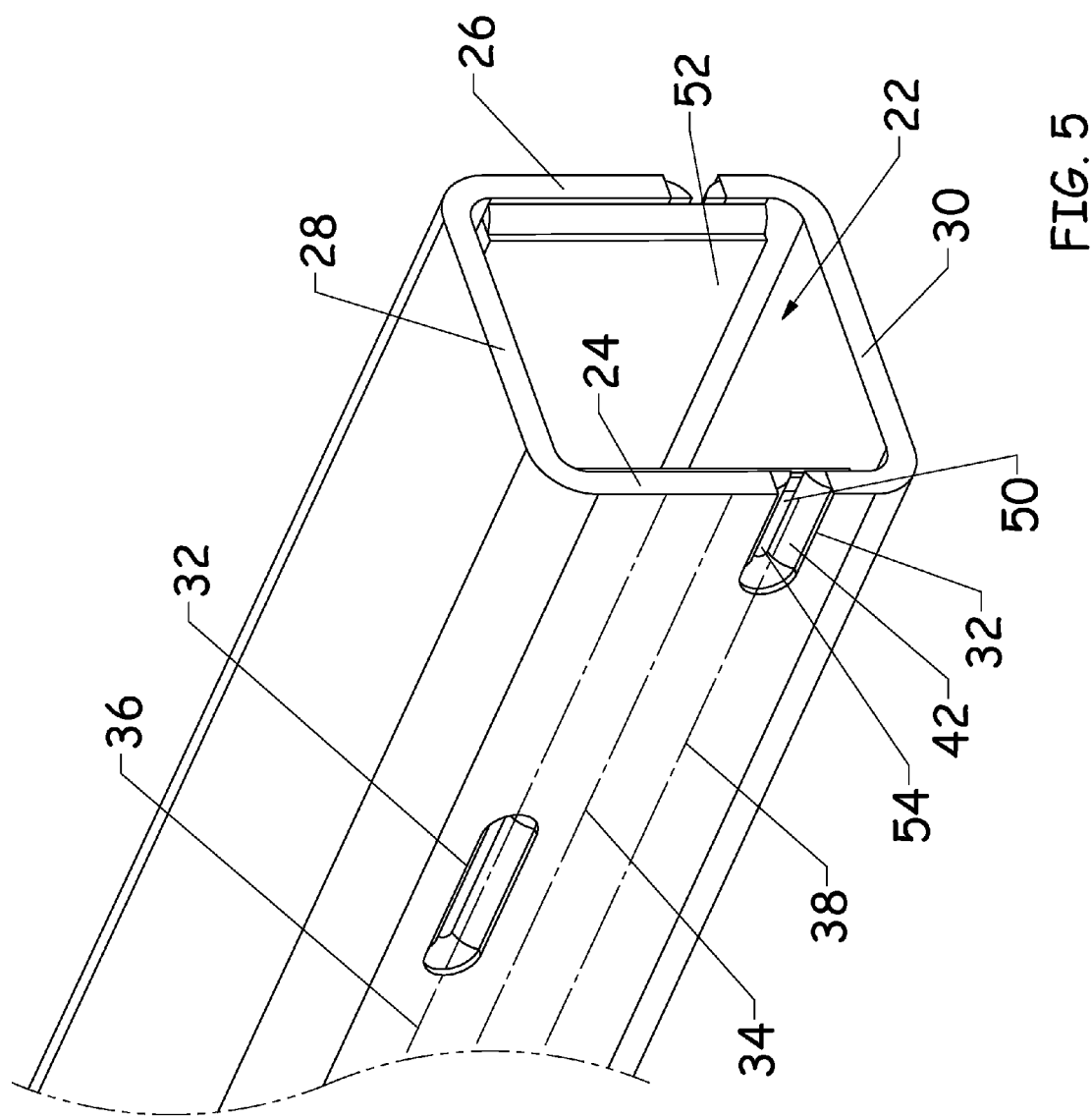
FIG. 5 is a schematic perspective view of an end portion of another illustrative embodiment.

With respect to the location of the apertures 32 on the perimeter wall 20, apertures may be formed in the first side wall portion 24 of the wall 20, and may also be formed in the second side wall portion 26 of the wall. The third 28 and fourth 30 side wall portions may be free of apertures. In a first configuration of the tool supporting bar 10, such as is shown in FIGS. 2 and 3, apertures 32 in the first side wall portion 24 may be arranged in a line, and the line may be located substantially equidistant from the third side wall portion 28 of the perimeter wall. Adjacent apertures 32 in the line of apertures may be substantially uniformly spaced from each other. In a second configuration of the tool support bar 10, such as is shown in FIG. 5, the apertures 32 in the first side wall portion 24 are arranged on either side of a longitudinal midline 34 of the first side wall portion, and the apertures may be arranged in at least two lines 36, 38 with each of the lines of apertures being positioned on either side of the longitudinal midline 34. The lines 36, 38 of apertures may be oriented substantially parallel to each other, and may be oriented substantially parallel to the longitudinal midline 34. The positions of the apertures 32 in a first one 36 of the lines may be arranged in an alternating lateral manner to the positions of the apertures in a second one 38 of the lines.

A significant aspect of the tool supporting bar 10 is the inclusion of at least one reinforcing wall that is located in the interior 22 of the perimeter wall 20 and that is mounted on the perimeter wall 20 in a manner that is effective to increase the bending or deflection resistance of the bar 10 to a force applied in a direction normal to a plane of one of the first 24 and second 26 side wall portions. The reinforcing wall may be attached to the perimeter wall 20 at discrete and separated or spaced locations along the length of the perimeter wall 20. The attachments at the locations are discrete in that the attachments may not be continuous along the length of the perimeter wall, and may have gaps or spaces that separate the various locations of attachment. The reinforcing wall may be secured to the perimeter wall at least three locations, but may be attached at three or more locations up to and exceeding 10 to 20 locations. Generally, the greater the number of attachments, the stronger the resistance of the bar 10 to flexing and deflection will be, although the complexity and cost of manufacturing the bar 10 will also increase.

The locations at which the reinforcing wall is attached to the perimeter wall 20 may generally correspond to the locations of the apertures 32. In some preferred embodiments of the tool supporting bar 10, the attachments of the reinforcing wall to the perimeter wall 20 are made by one or more welds 42 that connect the material of the perimeter wall at the edge of the aperture 32 to the material of the reinforcing wall. In some preferred embodiments, the reinforcing wall 50 extends from the first end of the perimeter wall to the second end of the perimeter wall, although this is not a critical aspect of the bar 10, and the reinforcing bar or bars may be positioned along portions of the bar and may not be continuous along the length of the perimeter wall of bar.

In the first configuration shown in FIGS. 1 through 4, the reinforcing wall 40 extends in a plane that is oriented substantially perpendicular to the first side wall portion 24, and may be oriented substantially perpendicular to the second side wall portion 26. The reinforcing wall 40 may extend in a plane oriented substantially parallel to the third side wall portion 28 and the fourth side wall portion 30. The reinforcing wall 40 may have opposite longitudinal edges 44, 45, and each of the opposite edges may be abutted against opposite locations on the interior surface 19 of the perimeter wall 20 in the interior of the bar 10, and may be abutted against the first 24 and second 26 side wall portions. More specifically, a first longitudinal edge 44 of the reinforcing wall may be abutted against the first side wall portion 24 and a second longitudinal edge of the reinforcing wall may be abutted against the second side wall portion 26.

In the first configuration, the first longitudinal edge 44 of the reinforcing wall 40 may be attached at discrete and separated or spaced locations to the first side wall portion 24 and the second longitudinal edge 45 of the wall 40 may be attached at discrete and separated locations to the second side wall portion 26. The longitudinal edges 44, 45 of the reinforcing wall may each be aligned with the line of apertures in the respective side wall portion. The first 44 and second 45 longitudinal edges of the reinforcing wall 40 may be attached to the respective first 24 and second 26 side wall portions of the perimeter wall 20. The reinforcing wall 40 thus forms a connection between the first 24 and second 26 side wall portions between the third 28 and fourth 30 side wall portions, and the bending or deflection force applied to the first side wall portion is applied to the edge of the reinforcing wall through the connection of the edge to the first side wall portion.

Figure 6:
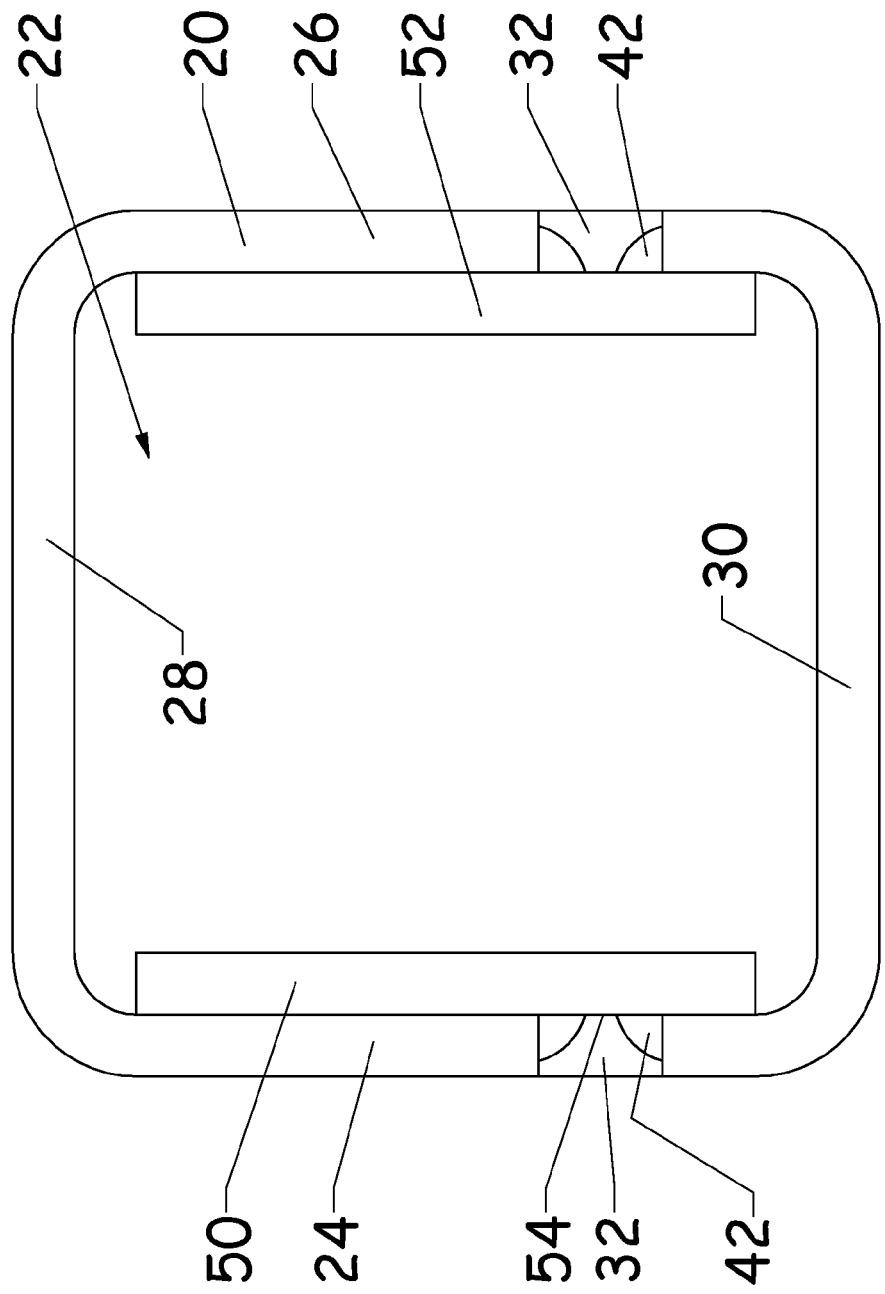
FIG. 6 is a schematic end view of the illustrative embodiment of FIG. 5.
Figure 7:
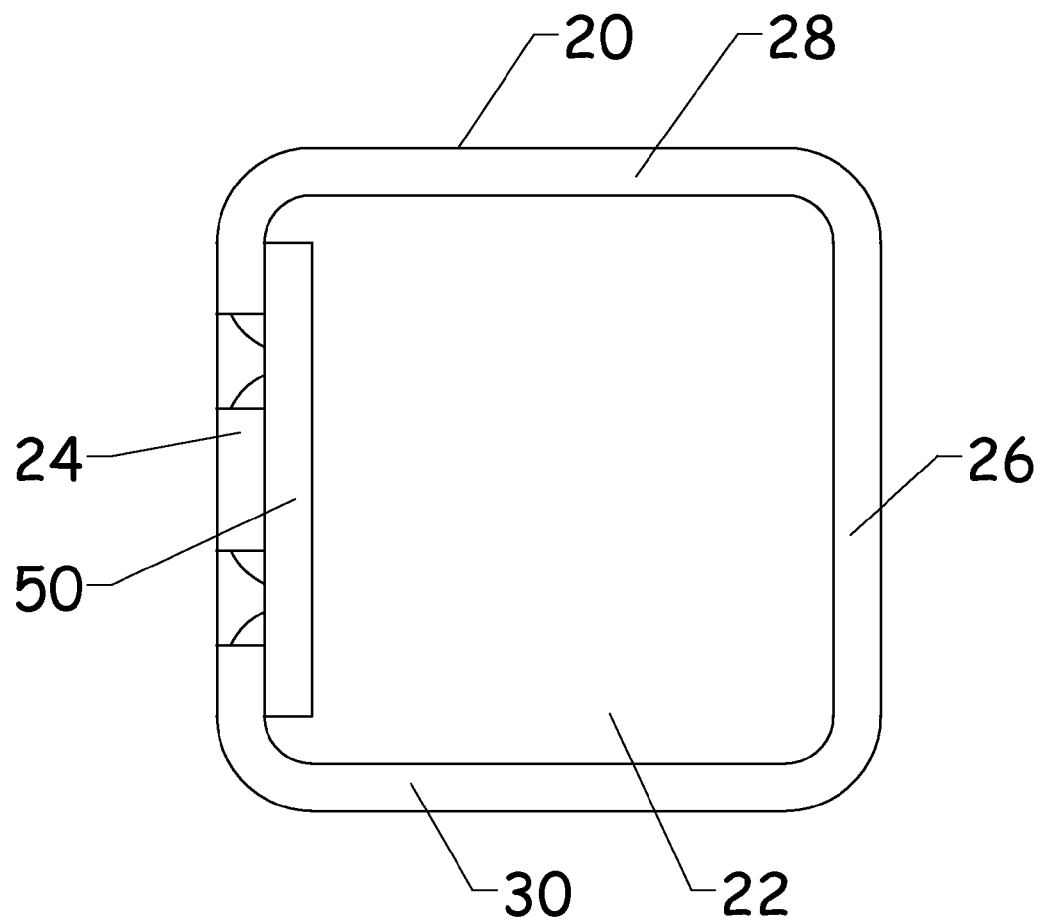
FIG. 7 is a schematic end view of another illustrative embodiment of the bar.

In the second configuration shown in FIGS. 5 through 7, the reinforcing wall 50 may extend in a plane oriented substantially parallel to the first side wall portion 24, and may be abutted against the first side wall portion. The reinforcing wall 50 may extend in a plane oriented substantially perpendicular to the third 28 and the fourth 30 side wall portions. In some embodiments of the second configuration, a second reinforcing wall 52 is located in the interior 22, and may be abutted against the second side wall portion 26. The first 50 and second 52 reinforcing walls may each extend in planes that are oriented substantially perpendicular to the third 28 and fourth 30 side wall portions.

In the second configuration, the first reinforcing wall 50 is attached to the first side wall portion 24 at the discrete and separate attachments at the locations of the apertures 32 in the side wall portion 24, and, if included, the second reinforcing wall 52 is attached to the second side wall portion 26 at the discrete and separate attachments at the locations of the apertures 32 in side wall portion 26. Illustratively, the first side wall portion 24 is attached to a face 54 of the first reinforcing wall 50, and the second side wall portion 26 is attached to a respective face of the second reinforcing wall. The first 24 and second 26 reinforcing walls are attached to the respective side wall portions to reinforce and increase the resistance to bending and deflection of the side wall portion, without adding additional material thickness and weight to the third 28 and fourth 30 side wall portions.

The reinforcing wall 50 may have a thickness that is approximately one half of the thickness of the perimeter wall to approximately twice the thickness of the perimeter wall, although other thicknesses may be utilized.

Significantly, in each of the first and second configurations discussed above, the resistance to deflection of the tool supporting bar 10 is increased without increasing the exterior dimensions of the bar 10, and without simply increasing the thickness of all wall portions of the perimeter wall, such as if a thicker gauge material was employed for the perimeter wall. The bar with the disclosed structure features enhanced resistance to deflection or bending in about one axis while the resistance to bending along other axes may remain the same or may be enhanced to a lesser extent. Thus, deflection resistance is increased in one or more directions in which a higher level of deflection resistance is needed, while deflection resistance in other directions may not be similarly enhanced, and a corresponding weight increase that would be associated with deflection resistance in those other directions is avoided. The deflection resistance of the bar is thus selectively increased in some directions and not increased (or not increased as much) in other directions.

For example, it was discovered that the first configuration increases the resistance to deflection by about 17%, while increasing the weight of the bar 10 by approximately 50%, when a reinforcing wall having a thickness approximately twice the thickness of the perimeter wall is utilized. The second configuration was observed to increase resistance to deflection by about 30% while the weight of the bar 10 was increased by about 40%, when each of the reinforcing walls utilized had a thickness approximately equal to the thick ness of the perimeter wall. In contrast, using tubing with a uniformly thicker wall thickness would increase the weight of the bar to a greater degree.

Another aspect of the disclosure involves a method of forming a tool bar having the advantages of the tool supporting bar 10 described herein. Initially, the method may include the act of providing an elongated perimeter wall that defines an interior, the perimeter wall having first 24 and second 26 side wall portions that may be positioned on opposite sides of the perimeter wall. The perimeter wall provided may or may not have all of the various aspects of the perimeter wall set forth elsewhere in this description. The method may further include the act of forming a plurality of apertures 32 in at least one of the side wall portions of the perimeter wall, and this act may further include forming the apertures in the opposite first and second side wall portions. The apertures formed may or may not have all of the aspects of the apertures described elsewhere in this description.

In some implementations of the method, the apertures may be formed on the first side wall portion in positions arranged in a line, and the line may be located substantially equidistant from the third side wall portion of the perimeter wall, and the lines may be located equidistant from the fourth side wall portion. The aperture may be formed on the second side wall portion with similar positioning. In other implementations of the method, the apertures may be formed on the first side wall portion in positions arranged on either side of a longitudinal midline of the first side wall portion, and the apertures may be arranged in at least two lines with each of the lines of apertures being positioned on either side of the longitudinal midline.

The method may further include the act of positioning at least one reinforcing wall in the interior of the perimeter wall. In some implementations of the method, the positioning of the reinforcing wall involves positioning one longitudinal edge of the reinforcing wall adjacent to apertures in the first side wall portion and the other longitudinal edge of the reinforcing wall adjacent to apertures in the second side wall portion, and the reinforcing wall may be oriented substantially perpendicular to the first side wall portion and to the second side wall portion. In other implementations of the method, positioning may involve positioning a face of one reinforcing wall adjacent to the portion of the interior surface of the perimeter wall that corresponds to the first side wall portion, and similarly positioning a face on another reinforcing wall adjacent to the portion of the interior surface on the second side wall portion. The faces of the reinforcing walls may be abutted against the respective side wall portions, such that the respective faces are moved next to the apertures in the side wall portions.

The method may also include the act of mounting at least one reinforcing wall on the perimeter wall in a manner that is effective to increase the bending resistance of the perimeter wall to a force applied in a direction normal to a plane of one of the first and second side wall portions. In some implementations of the method, the act of mounting may include attaching the reinforcing wall to the perimeter wall at discrete and separated or spaced locations along the length of the perimeter wall. The attaching may be performed at the locations of the apertures on the side wall portions of the perimeter wall. The act of mounting may include welding the reinforcing wall to the perimeter wall at the locations of the apertures in the perimeter wall. The bead of the weld may extend along the edge defining the aperture, or only a portion of the aperture.

Figure 8:
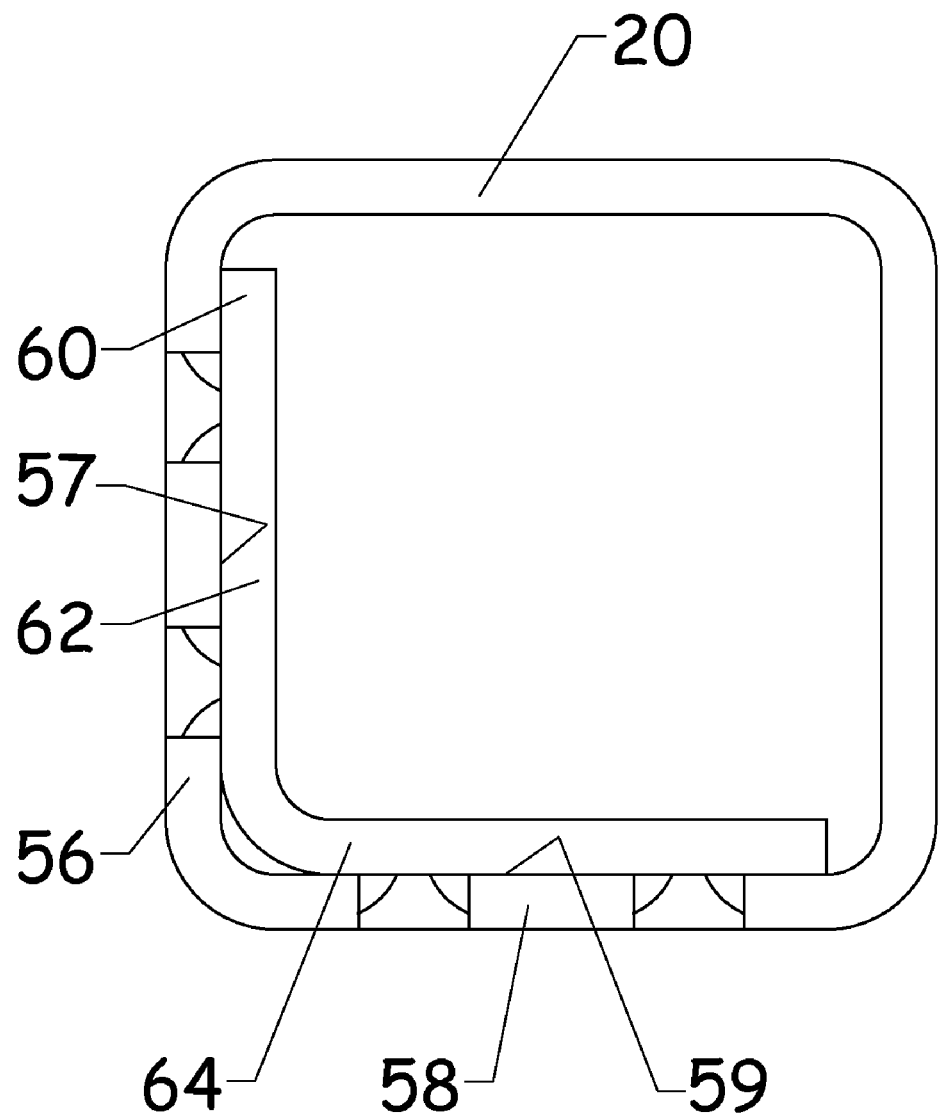
FIG. 8 is a schematic end view of yet another illustrative embodiment of the bar.

In other embodiments of the bar, such as is shown in FIG. 8, the perimeter wall includes first 56 and second 58 side wall portions positioned adjacent to each other on the perimeter. Each of the two side wall portions 56, 58 has a respective interior surface 57, 59. The interior surface 57 of the first side wall portion may extend at a non-zero angle with respect to the interior surface 59 of the second side wall portion. In some implementations, the first side wall portion 56, and the interior surface 57 thereof, is oriented substantially perpendicular to the second side wall portion 58 and the interior surface 59 thereof. At least one reinforcing wall 60 is present, and includes a first section 62 that extends along and is mounted on the first side wall portion 56 and a second section 64 that extends along and is mounted on the second side wall portion 58. In some implementations, the first section 62 may be oriented substantially perpendicular to the second section 64 of the reinforcing wall. It should be recognized that the relative position of the sections 62, 64 of the reinforcing wall 60 may be changed or shifted in the bar (which would be equivalent to rotating the bar about its longitudinal axis) without departing from the disclosure.

Figure 9:
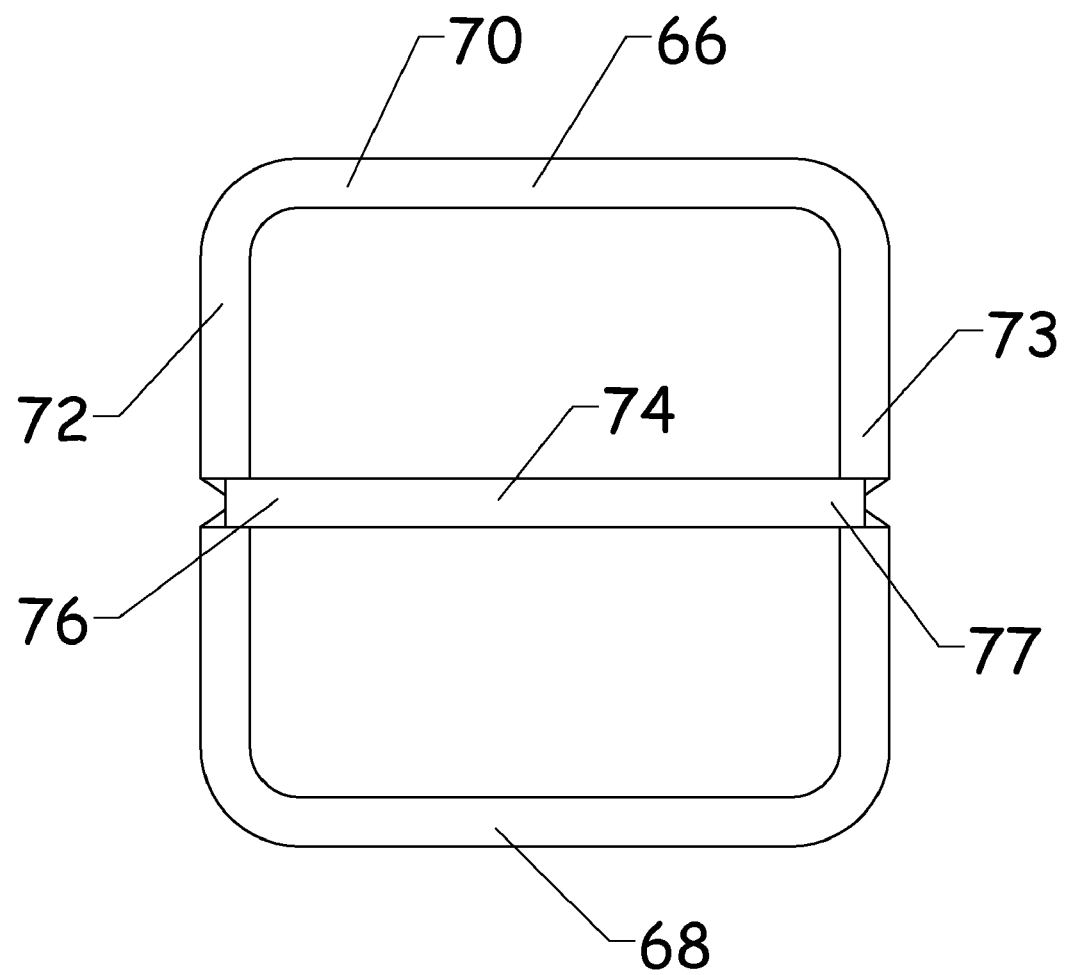
FIG. 9 is a schematic end view of still another illustrative embodiment of the bar.

In still other embodiments of the bar, such as is shown in FIG. 9, the perimeter wall includes two perimeter wall portions 66 and 68, and each perimeter wall portion 66, 68 may include a first side wall portion 70 and sections 72, 73 of two other side wall portions. Each of the sections 72, 73 may extend from the first side wall portion 70, and in some embodiments the perimeter wall portion 70 is substantially U-shaped. The first 66 and second 68 perimeter wall portions may be positioned in opposition to each other. The reinforcing wall 74 may extend across the interior of the perimeter wall, and may bisect the interior. The reinforcing wall 74 may extend between the opposite side wall portions of the perimeter wall, and may be positioned between the first section of the side wall portion of the first perimeter wall portion 66 and the first section of the side wall portion of the second perimeter wall portion 68. In some embodiments, longitudinal marginal portions 76, 77 of the reinforcing wall 74 may be positioned between and connected to the two wall portions 66, 68.

Figure 10:
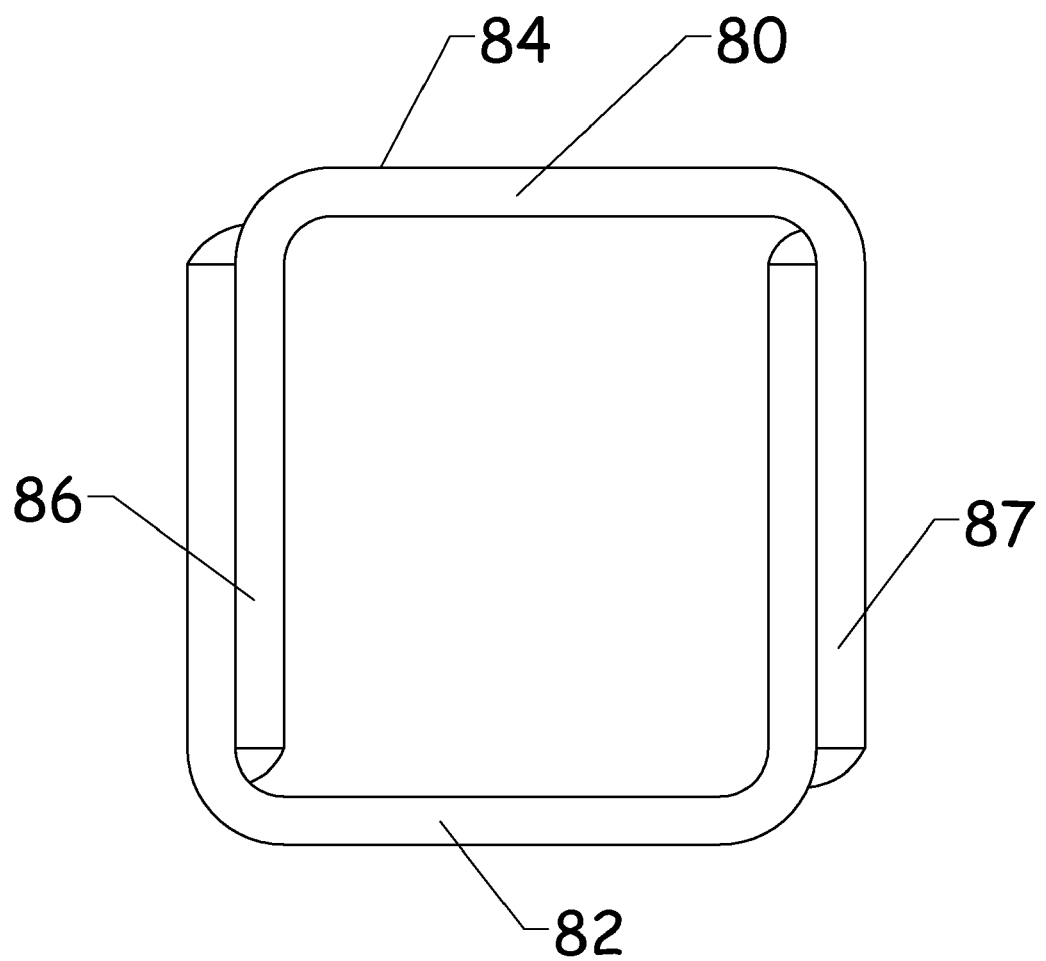
FIG. 10 is a schematic end view of yet still another illustrative embodiment of the bar.

In yet other embodiments of the bar, such as is shown in FIG. 10, the perimeter wall includes a first perimeter wall portion 80 and a second perimeter wall portion 82. Each of the perimeter wall portions 80, 82 may include a first side wall portion 84 and sections 86, 87 of two other side wall portions, and each of the sections 86, 87 may extend from the first side wall portion. In some embodiments, each of the perimeter wall portions 80, 82 may be substantially U-shaped. The two wall portions 80, 82 may be connected together in a way such that a first section of the first perimeter wall portion 80 overlaps a first section of the second perimeter wall portion 82, and a second section of the first wall portion 80 overlaps a second section of the second wall portion 82. The first section of the first perimeter wall portion 80 may be connected to the first section of the second perimeter wall portion 82 and the second section of the first perimeter wall portion 80 may be connected to the second section of the second perimeter wall portion. In some implementations, the first section of the first perimeter wall portion may substantially completely overlap the first section of the second perimeter wall portion 82 and the second section of the first perimeter wall portion 80 may substantially completely overlap the second section of the second perimeter wall portion. In some further implementations, the section of the first perimeter wall portion 80 may be substantially coextensive with the section of the second perimeter wall portion 82 and the second section of the first perimeter wall portion 80 is substantially coextensive with the second section of the second perimeter wall portion 82.

Figure 11:
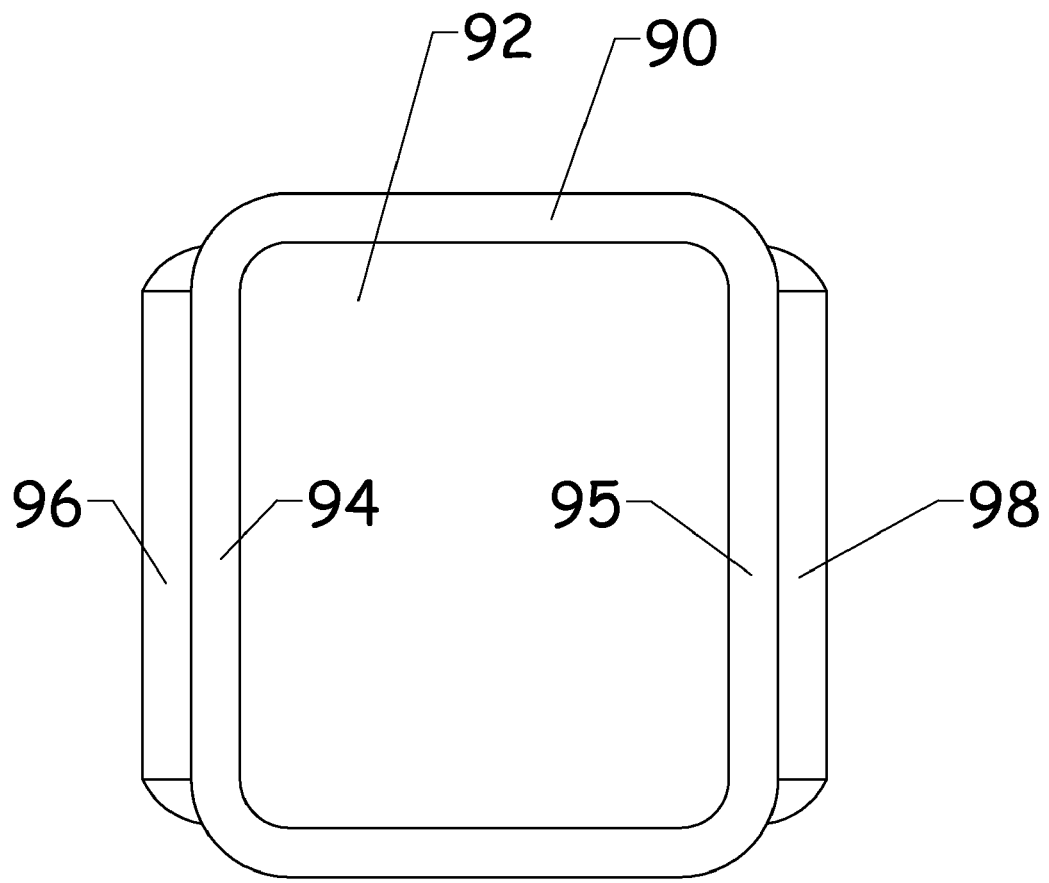
FIG. 11 is a schematic end view of another illustrative embodiment of the bar.

In a still yet further embodiments, such as shown in FIG. 11, the bar may include an elongated tubular perimeter wall 90 that defines an interior 92, and may include at least a pair of substantially parallel opposite side wall portions 94, 95 that each have an exterior surface opposite of the interior 92 of the perimeter wall. The bar may further include at least a pair of reinforcing walls 96, 98 mounted on the perimeter wall 90 in a manner that is effective to increase bending resistance of the perimeter wall to a force applied in a direction normal to a plane of one of the side wall portions 94, 95. Each of the reinforcing walls may be mounted on the exterior surface of one of the opposite side wall portions 94, 95. Significantly, if the dimension of the perimeter wall of the bar is decreased in the direction of the side or sides on which the reinforcing wall(s) are added, this arrangement does not increase the exterior dimension of the bar in the height or width directions. Thus, an approximately 7 inch by 7 inch outside dimension may be maintained by using an approximately 6 inch by 7 inch outside size perimeter wall, and positioning the reinforcement walls on the side wall portions that have the 6 inch outside dimension between them. Embodiments of this character may be highly useful for tools designed to mount on the bar and that are configured to match the common height and width dimensions.

It should be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A tool supporting bar for supporting tools on an implement, the tool supporting bar comprising:
   an elongated tubular perimeter wall defining an interior, the perimeter wall includes at least one side wall portion, the perimeter wall including at least one side wall portion with a substantially planar interior surface; and
   at least one reinforcing wall located in the interior of the perimeter wall and mounted on the perimeter wall in a manner effective to increase bending resistance of the perimeter wall to a force applied in a direction normal to a plane of the at least one side wall portion;
   wherein the at least one reinforcing wall comprises a plate with a face abutted against the interior surface of the at least one side wall portion of the perimeter wall such that substantially an entirety of the face of the reinforcing wall is abutted against the interior surface of the side wall portion; and
   wherein the at least one side wall portion includes a plurality of apertures extending therethrough, the at least one reinforcing wall being attached to the at least one side wall portion at each aperture.

2. The tool supporting bar of claim 1 wherein the at least one reinforcing wall is attached to the perimeter wall at discrete and separated locations of the apertures along a length of the perimeter wall.

3. The tool supporting bar of claim 1 wherein the tubular perimeter wall is a unitary preformed tubular element.

4. The tool supporting bar of claim 1 wherein the at least one reinforcing wall is welded to the perimeter wall at discrete and separated locations of the apertures along a length of the perimeter wall.

5. The tool supporting bar of claim 1 wherein the reinforcing wall is continuous without apertures between opposite ends of the wall.

6. The tool supporting bar of claim 1 wherein the at least one side wall portion comprises a first side wall portion and the perimeter wall includes a second side wall portion located substantially opposite of the first side wall portion; and
   wherein the at least one reinforcing wall comprises two separate reinforcing walls located in the interior of the perimeter wall, second one of the reinforcing walls comprising a plate having a face abutted against an interior surface of the second wall portion, the first reinforcing wall being attached to the first side wall portion at discrete and separated locations of the first side wall portion and the second reinforcing wall being attached to the second side wall portion at discrete and separated locations of the second side wall portion.

7. The tool supporting bar of claim 1 wherein the apertures of the plurality of apertures are spaced with respect to each other in a longitudinal direction of the perimeter wall.

8. The tool supporting bar of claim 1 wherein the plurality of apertures in the at least one side wall portion are arranged in a line, the line extending longitudinally with respect to the perimeter wall.

9. The tool supporting bar of claim 1 wherein the plurality of apertures in the at least one side wall portion are arranged on either side of a longitudinal midline of the at least one side wall portion.

10. The tool supporting bar of claim 1 wherein the plurality of apertures are arranged in at least two lines spaced from each other on a same one of the side wall portions.

11. The tool supporting bar of claim 1 wherein the at least one side wall portion comprises a first side wall portion and the perimeter wall includes a second side wall portion located substantially opposite of the first side wall portion; and
   wherein the plurality of apertures are formed in the first side wall portion and the second side wall portion of the perimeter wall.

12. The tool supporting bar of claim 1
   wherein the plate of the at least one reinforcing wall extends in a plane oriented substantially parallel to the first side wall portion.

13. The tool supporting bar of claim 1 wherein the at least one reinforcing wall has opposite first and second longitudinal edges, each of the opposite edges being positioned adjacent to the interior surface of the first side wall portion.

14. A tool supporting bar for supporting tools on an implement, the tool supporting bar comprising:
   an elongated tubular perimeter wall defining an interior, the perimeter wall including a first perimeter wall portion and a second perimeter wall portion, each of the perimeter wall portions including a first side wall portion and sections of two other side wall portions each extending from the first side wall portion, each of the perimeter wall portions being substantially U-shaped and being positioned in opposition to each other, and wherein the two perimeter wall portions are connected together such that a first section of the first perimeter wall portion overlaps a first section of the second perimeter wall portion, and a second section of the first perimeter wall portion overlaps a second section of the second perimeter wall portion.

15. The tool supporting bar of claim 14 wherein the first section of the first perimeter wall portion is connected to the first section of the second perimeter wall portion and the second section of the first perimeter wall portion is connected to the second section of the second perimeter wall portion.

16. The tool supporting bar of claim 14 wherein the first section of the first perimeter wall portion substantially completely overlaps the first section of the second perimeter wall portion and the second section of the first perimeter wall portion substantially completely overlaps the second section of the second perimeter wall portion.

17. A tool supporting bar for supporting tools on an implement, the tool supporting bar comprising:
- an elongated tubular perimeter wall defining an interior, the perimeter wall includes at least a pair of substantially parallel opposite side wall portions having interior surfaces positioned in opposition to each other; and
- at least a pair of reinforcing walls mounted on the perimeter wall, each of the reinforcing walls being mounted on one of the opposite side wall portions;
- wherein each of the reinforcing walls comprises a plate with a face abutted against the interior surface of the opposite side wall portion of the perimeter wall such that substantially an entirety of the face of the reinforcing wall is abutted against the interior surface of the respective side wall portion; and wherein each of the pair of side wall portions includes a plurality of apertures extending therethrough, the at least one reinforcing wall being attached to the at least one side wall portion at each aperture to increase bending resistance of the perimeter wall to a force applied in a direction normal to a plane of one of the side wall portions.

18. A tool supporting bar for supporting tools on an implement, the tool supporting bar comprising:
- an elongated tubular perimeter wall defining an interior, the perimeter wall includes at least two side wall portions positioned in opposition to each other on the perimeter wall, a plurality of apertures being formed in each of the opposite side wall portions; and
- at least one elongated reinforcing wall located in the interior of the perimeter wall and mounted on the perimeter wall;
- wherein the reinforcing wall comprises a substantially planar plate with opposite longitudinal edges extending along a length of the plate, the opposite longitudinal edges being abutted against opposite facing surfaces of the opposite side wall portions of the perimeter wall, the opposite longitudinal edges of the reinforcing wall being attached to the opposite side wall portions at the apertures to increase bending resistance of the perimeter wall to a force applied in a direction normal to a plane of the at least one side wall portion.

* * * * *